(12) United States Patent
Lluisma (10) Patent No.: US 11,693,542 B2
(45) Date of Patent: Jul. 4, 2023

(54) USER INTERFACE FOR DARKROOM PROCESS TIMER AND FILM PROCESSOR

(71) Applicant: Derek Lluisma, Fountain Hills, AZ (US)

(72) Inventor: Derek Lluisma, Fountain Hills, AZ (US)

( * ) Notice: Subject to any disclaimer, the term of this patent is extended or adjusted under 35 U.S.C. 154(b) by 0 days.

(21) Appl. No.: 17/952,140

(22) Filed: Sep. 23, 2022

(65) Prior Publication Data

US 2023/0129452 A1    Apr. 27, 2023

Related U.S. Application Data

(60) Provisional application No. 63/247,803, filed on Sep. 24, 2021.

(51) Int. Cl.
  *G06F 3/048*     (2013.01)
  *G06F 3/0484*    (2022.01)
  *G03D 3/13*      (2006.01)

(52) U.S. Cl.
  CPC ............ *G06F 3/0484* (2013.01); *G03D 3/13* (2013.01)

(58) Field of Classification Search
  CPC ................................. G06F 3/0484; G03D 3/13
  See application file for complete search history.

(56) References Cited

U.S. PATENT DOCUMENTS

| | | | | |
|---|---|---|---|---|
| 3,615,479 A * | 10/1971 | Kohler | ...................... | G03C 5/58 |
| | | | | 430/30 |
| 4,097,884 A * | 6/1978 | Lasky | ...................... | G03D 13/02 |
| | | | | 396/636 |
| 2020/0071265 A1* | 3/2020 | Dhawan | ................. | C07C 229/16 |

* cited by examiner

*Primary Examiner* — David E Choi (57) ABSTRACT

The present invention comprises a novel user interface for a darkroom process timer and film processor. The user interface provides all necessary functionality for operating a programmable timer designed to time a sequence of multiple processing steps corresponding to a darkroom process. The necessary functionality includes: a means of specifying a time for a step, a means of specifying an agitation technique for a step, a means of specifying an operating temperature for a step, a means of starting the timer, a means of stopping the timer, a means of resetting the timer, a means of selecting a step, a means of signaling alarms, and a means of relaying instructions to the user.

22 Claims, 14 Drawing Sheets

USER INTERFACE FOR DARKROOM PROCESS TIMER AND FILM PROCESSOR

FIELD OF THE INVENTION

The present invention relates to a novel user interface for a darkroom process timer and film processor. More particularly, the invention relates to a user interface for a programmable temperature compensating darkroom process timer and film processor.

BACKGROUND

Analog photography lends a unique look still not found in digital photography. There are many photographers who still take pictures using analog film and make darkroom prints on chemically processed light sensitive paper. In the world of analog photography, there are hundreds of different types of film and print processing equipment.

Processing equipment can be classified as manual, semi-automatic, and automatic.

Manual processing equipment offers a means to submerging films or prints in a light tight development tank or drum. The photographer has to load his films or prints into the light tight tank, manually pour in and out different photographic chemicals, and manually agitate the films in the tank by inverting the tank, rotating the tank, stirring films with a spindle, shaking films by hand, etc.

Semi-automatic processing equipment offers not only development tanks but a processor which automatically agitates the films or prints in the tank. The photographer has to load his films or prints into the light tight tank, then attaches said development tank to a processor device which automatically agitates the films or prints inside. There is no need to manually agitate the films or prints in the tank by hand inversion, rotation, stirring, shaking, etc. The photographer still has to manually pour a multitude of chemicals in and out of the tank during a process.

Automatic processing equipment performs an entire process to completion with no human intervention. The photographer loads his films or prints into the processor. The processor automatically submerges film or prints in different chemicals. Agitation is fully automated. All the photographer has to do is sit and wait until his films or prints come out completely processed, then let his films or prints sit to dry.

When using manual and semi-automatic processing equipment, the photographer has to not only introduce multiple chemicals to films or prints through a sequence of process steps, but has to monitor the temperature of each chemical and the exact time in seconds for which films or prints are submerged in each chemical for each step.

The time and temperature are what determine the result of the development process. Being able to effectively monitor and time any film or print process is crucial to achieving desired development. For black and white films (not color films), it is even desirable to be able to calculate new compensated development times to achieve desired development when operating within the current room temperature.

Many photographers use smart phone applications or other simple timers which are merely a stop watch with an alarm. The photographer still has to invest much of his time and effort into manually memorizing and inputting times and monitoring chemistry temperature (or looking up new compensated development times for the current room temperature from a table).

The most serious of photographers need to be able to process their films and prints consistently over a time span of years and decades. This can be better achieved by having a user interface which allows one to time and monitor their processing more effectively in a standardized manner. It is even better if the user interface gives direct control over the film processor which is synchronized with the timer.

Therefore a need exists for a novel user interface for a programmable temperature compensating darkroom process timer capable of providing direct synchronized control over a film processor.

BRIEF SUMMARY OF THE INVENTION

The present invention comprises a novel user interface for a programmable temperature compensating darkroom process timer and film processor. The user interface comprises a main menu with three entries: exit, process timer, and setup. Selecting the process timer entry opens a process timer interface which allows the photographer to time an active process and control the film processor in sync. Selecting the setup entry opens a sub-menu with additional entries for inputting process times, configuring temperature compensation, configuring film processor settings, saving all settings and process times into profiles, and managing profiles within a file system.

DETAILED DESCRIPTION OF THE INVENTION

Embodiments of the present invention are directed to a user interface for a programmable temperature compensating darkroom process timer and film processor. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
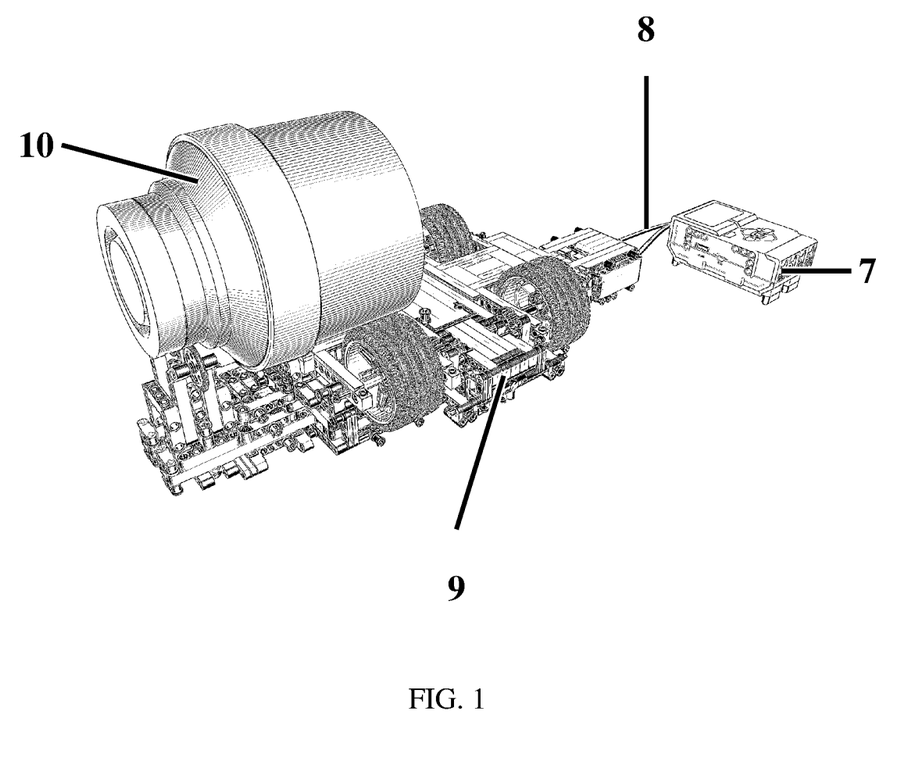
FIG. 1 is an illustration of an example of a timer device for displaying the user interface for a programmable temperature compensating darkroom process timer and film processor. The exemplary timer device is shown to be connected to an example of a semi-automatic film processor capable of rotating a development tank.
Figure 2:
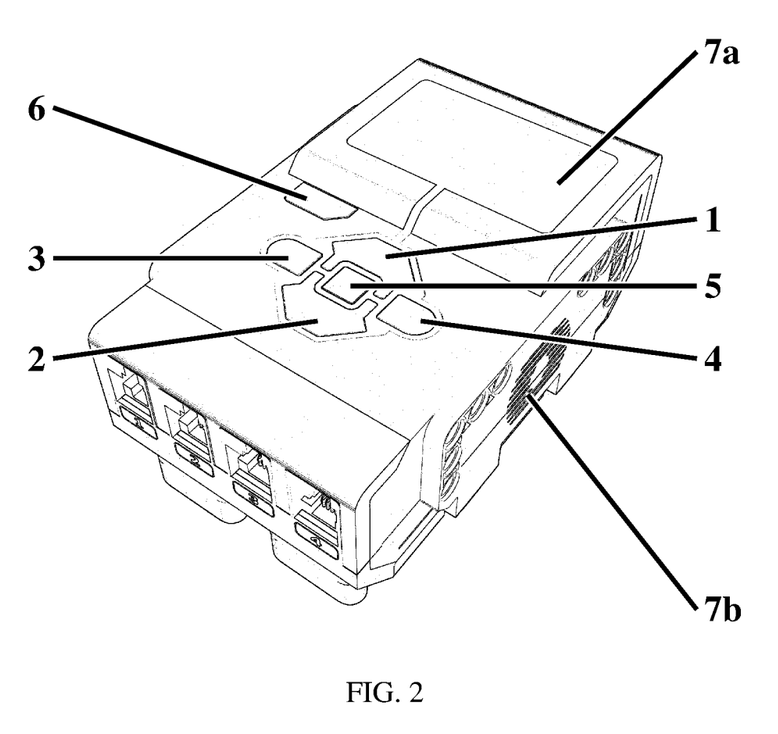
FIG. 2 is an illustration of a close up view of an example of a timer device.

Referring now to FIG. 1 and FIG. 2, an example of a timer device, film processor, and development tank for practicing the various embodiments of the invention will be described. The timer device 7 comprises electronic display screen 7*a*, audio speaker 7*b*, and five navigation buttons: Up 1, Down 2, Left 3, Right 4, Center/Select 5, and Back 6. Timer device 7 is connected to, powers, and controls film processor 9 via cables 8. Timer device 7 itself is powered by batteries. Development tank 10 may contain films or prints inside and is rotated by the film processor 9.

Figure 3:
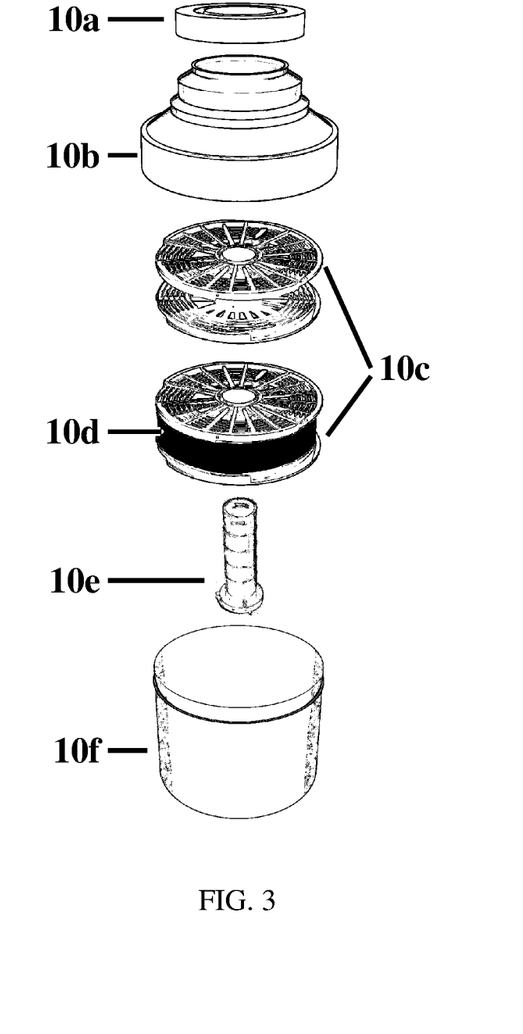
FIG. 3 is an illustration of an exploded view of an example of a development tank, which contains reels which that hold photographic film.

FIG. 3 illustrates an exploded view of an example of a development tank. Development tank 10 is comprised of cap 10*a*, lid 10*b*, one or more reels 10*c*, photographic film 10*d*, core 10*e*, and body 10*f*. Photographic film 10*d* is loaded in total darkness onto reels 10*c*. Reels 10*c* are connected to core 10*e* then placed into body 10*f*. Lid 10*b* attaches to body 10*f* and protects inner contents such as photographic film 10*d* from light. Lid 10*b* has an opening on the top which allows the photographer to pour in chemistry while keeping inner contents safe from light. The cap 10*a* is connected to lid 10*b* to seal the opening and ensure no chemistry leakage. Cap 10*a* may be made of plastic, metal, hard rubber, or any other suitable material. Lid 10*b*, reel 10*c*, core 10*e*, and body 10*f* may be made of plastic, metal, or any other suitable material. In other embodiments, photographic film 10*d* of different formats (8 mm, 16 mm, 35 mm, 120/220, 4×5", 8×10", etc.) may be loaded into tank body 10*f* with or without the use of reels 10*c* or core 10*e*. In other embodiments, body 10*f* and lid 10*b* may be larger or smaller in size to accommodate different quantities and sizes of photographic films or paper. In other embodiments, light-sensitive paper may be loaded directly into tank body 10*f* instead of photographic film 10*d*.

The user interface being described as the present invention comprises multiple menus with a scrollable list of entries and multiple interfaces with multiple elements (like buttons and text). Through our exemplary timer device, the user may navigate the user interface by pressing the five navigation buttons: Up 1, Down 2, Left 3, Right 4, Center/Select 5, and Back 6.

Figure 4:
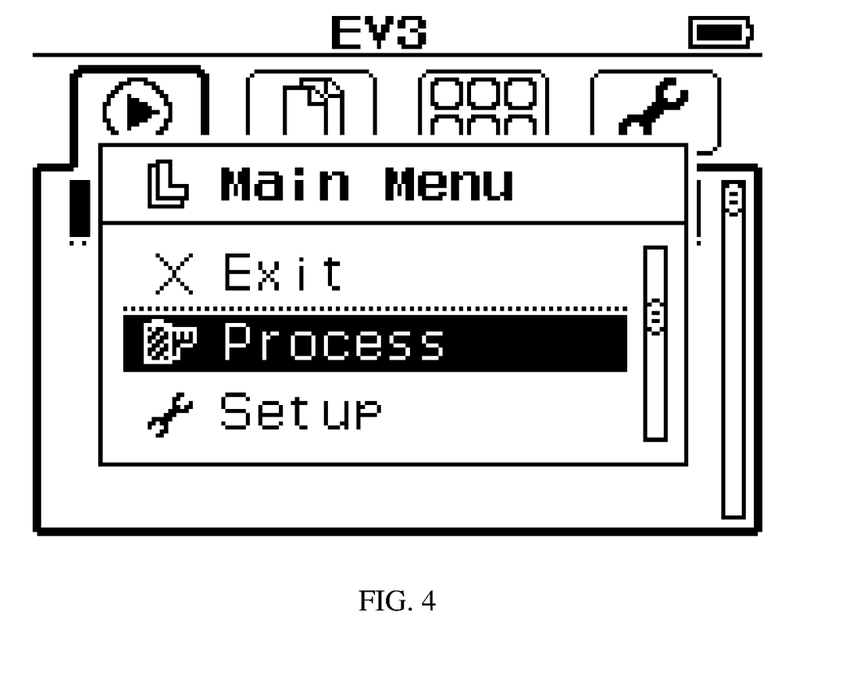
FIG. 4 is an illustration of a electronic display showing the main menu of the user interface.

FIG. 4 illustrates the main menu of the aforementioned user interface on an electronic screen display (of the exemplary timer device). The main menu comprises a scrollable list of entries. There are four entries: Exit, Process, Setup, and Info. Selecting the Exit entry exits the user interface. Selecting the Process entry opens the process timer interface illustrated in FIG. 5. Selecting the Setup entry opens the setup menu illustrated in FIG. 6. Selecting the Info entry merely displays the version number of the user interface software on the screen.

Figure 5:
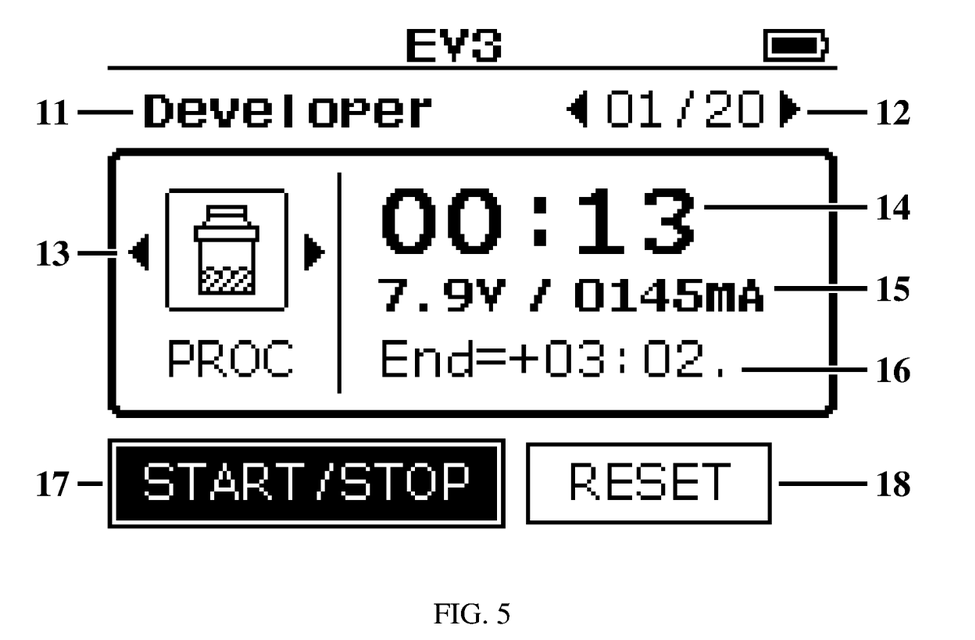
FIG. 5 is an illustration of an electronic display showing the process timer interface.

FIG. 5 illustrates the process timer interface on an electronic display. The processor timer interface comprises the following elements: step name 11, step navigator 12, step mode picker 13, step elapsed time 14, processor electrical information 15, message line 16, START/STOP button 17, and RESET button 18.

The process timer interface allows the user to cycle through up to 20 consecutive programmed steps each with their own names, modes, and times. Different embodiments may allow the use of more than 20 programmed steps. The name of the current step is displayed as step name 11. Step navigator 12 allows the user to view and select which step is currently active. Step navigator 12 can be scrolled left or right to select the current step. The elapsed time (counting up in seconds) since the start time for the current step is displayed as step elapsed time 14. Electrical voltage and electrical current measurements of the timer device is displayed as processor electrical information 15. Communication to the user is achieved using instructions displayed in message line 16. Other information such as a countdown to the end of the programmed step or film processor rotation speeds can also be displayed in the message line 16.

START/STOP button 17 may be selected to start the process timer if not running or stop the process timer if already running. Once started, the process timer will keep counting up in seconds until stopped. When the process timer is stopped, the step navigator 12 automatically selects the next programmed step if the step elapsed time has reached the programmed step time with temperature compensation applied.

RESET button 18 may be selected to reset the step elapsed time to 00:00. Resetting the step elapsed time is only permitted if the process timer is not running.

When certain criterion are reached, alarms may be signaled by the process timer according to the various embodiments of the present invention. The behavior of the process timer and when alarms are signaled changes according to the current step mode. The user can scroll left or right to select different step modes using step mode picker 13. There are four different step modes: PROC, WASH, TIME, and METR.

When running the process timer in PROC mode, an alarm is signaled 10 seconds before the user programmed step time with temperature compensation applied has elapsed. Then, instructions are displayed in message line 16 indicating the process timer has reached the programmed time and the user should stop the process timer. While the process timer is running, film processor 9 is actively rotating development tank 10 which contains films or prints. Films or prints are agitated for the development process.

When running the process timer in WASH mode, an alarm is signaled every 30 seconds until the user programmed step time with temperature compensation applied has elapsed. Every time an alarm is signaled, instructions are displayed in message line 16 indicating the process timer has reached the end of a 30 second wash cycle and the user should stop the process timer, empty then refill the exemplary development tank 10 with fresh water, start the process timer again to continue with the next 30 second cycle, and repeat until the programmed step time with temperature compensation applied has elapsed and the step is completed.

When running the process timer in TIME mode, an alarm is signaled when the user programmed step time with temperature compensation applied has elapsed. Then, instructions are displayed in message line 16 indicating the process timer has reached the programmed time and the user should stop the process timer. While the process timer is running, film processor 9 is not actively rotating development tank 10. Cables 8, which connect the film processor 9 and timer device 7, may even be disconnected.

When running the process timer in METR mode, operation is equivalent to TIME mode but with only one difference: a metronome sounds a beep every second the process timer is running. The metronome allows the user to count and time how many seconds have passed without looking at the display.

Figure 6:
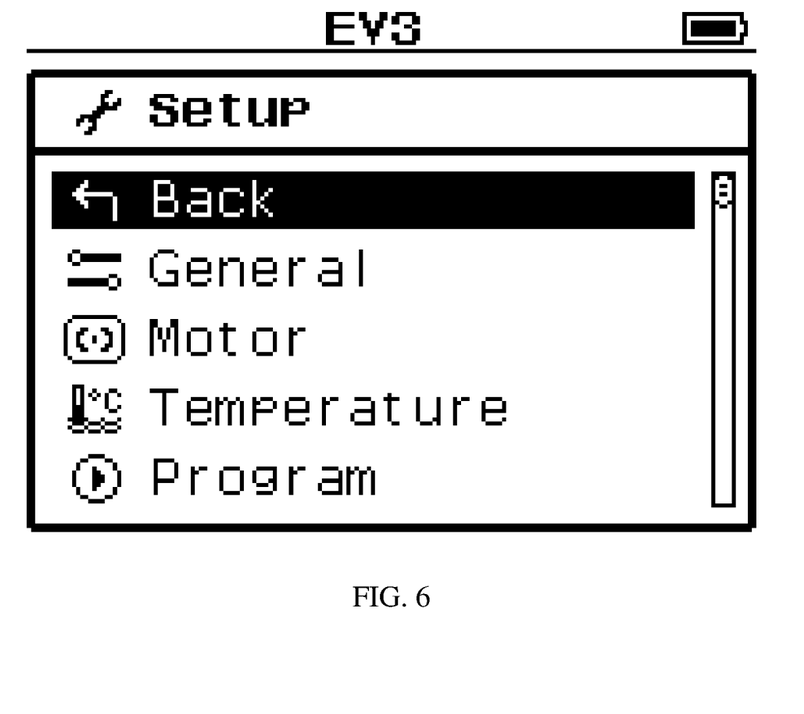
FIG. 6 is an illustration of an electronic display showing the setup menu for input processing times and configuring film processor settings. The setup menu has the following entries: General, Motor, Temperature, Program, Profile, and Reset.

Referring now to FIG. 6, an electronic display showing the setup menu is illustrated. The setup menu comprises a scrollable list of entries. There are a minimum of six entries: General, Motor, Temperature, Program, Profile, and Reset. Different embodiments and devices may require additional entries for configurable settings specific to said embodiments.

Figure 7:
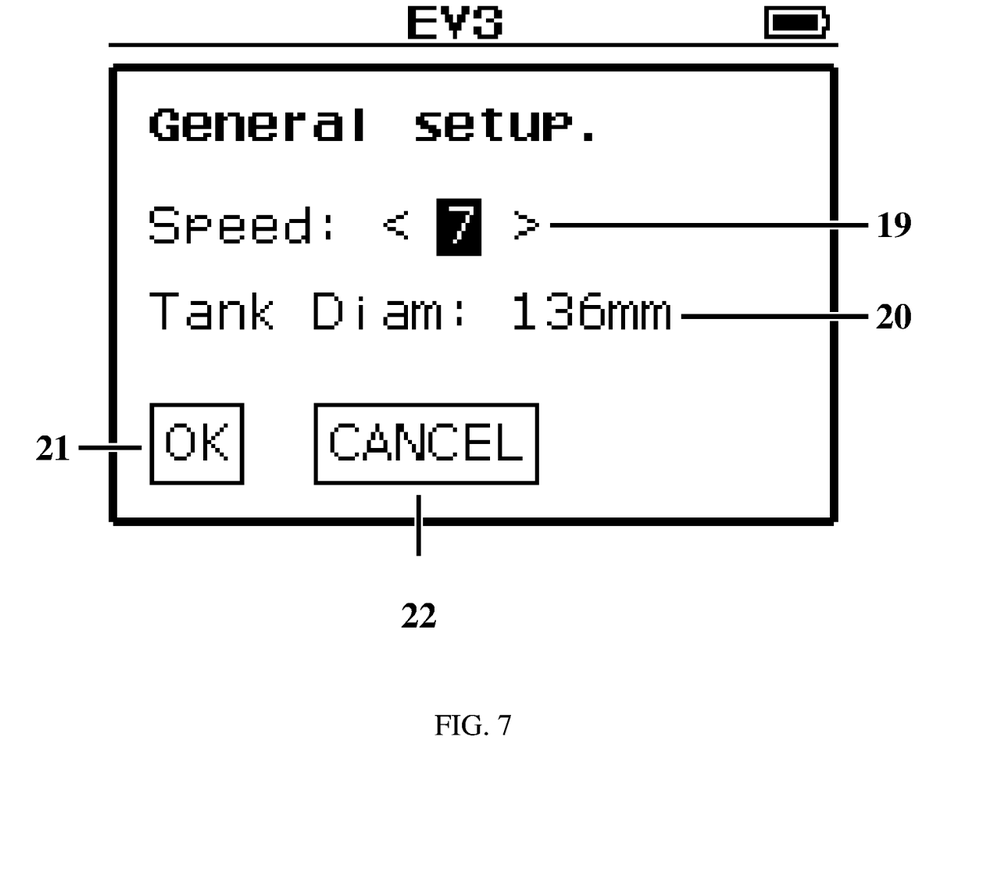
FIG. 7 is an illustration of an electronic display showing the general interface for general configuration of the film processor. The user can input the speed of agitation of films and the diameter of the development tank in use.

Selecting the General entry opens the general interface illustrated in FIG. 7. Selecting the Motor entry opens the motor interface illustrated in FIG. 8. Selecting the Temperature entry opens the temperature interface illustrated in FIG. 9. Selecting the Program entry opens the program menu illustrated in FIG. 10. Selecting the Profile entry opens the profile menu illustrated in FIG. 12. Selecting the Reset entry opens the reset confirmation popup window illustrated in FIG. 14.

FIG. 7 illustrates an electronic display showing the general interface for general configuration of the film processor. The general interface comprises the following elements: speed picker 19, tank diameter picker 20, OK button 21, and CANCEL button 22. Speed picker 19 can be scrolled left or right to set the agitation speed to an integer ranging from 1 (the slowest) to 7 (the fastest). For film processor 9, the agitation speed refers to the speed of rotation applied to development tank 10. Tank diameter picker 20 can be scrolled left or right to input the diameter of development tank 10 currently in use. The tank diameter inputted by the user is information used to accurately control film processor 9. Changes to settings in the general interface are saved by selecting OK button 21. Changes to settings in the general interface are reverted by selecting CANCEL button 22. After selecting either OK button 21 or CANCEL button 22, the general interface exits.

Figure 8:
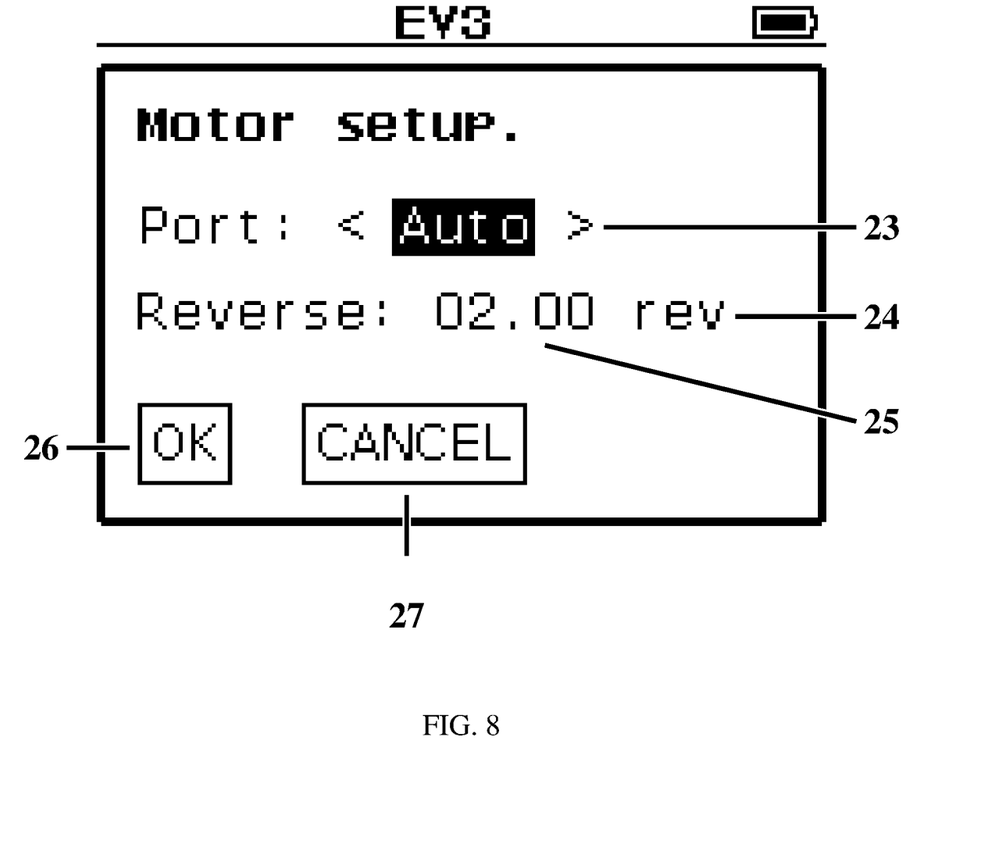
FIG. 8 is an illustration of an electronic display showing the motor interface for configuring film processor motor control. The user can specify which motors to use (if applicable to embodiments) and input how many times the development tank should be rotated in each cycle for agitation of films or prints.

FIG. 8 illustrates an electronic display showing the motor interface for configuring film processor motor control. The motor interface comprises the following elements: port picker 23, auto-reversing picker 25, auto-reversing unit picker 24, OK button 26, and CANCEL button 27. Port picker 23 can be scrolled left or right to specify the transfer of electric power to different output ports connected to motors if applicable to embodiments. Auto-reversing picker 25 can be scrolled left or right to set the length (scalar) of each agitation cycle. The length (scalar) of each agitation cycle is specified as a positive real number. Auto-reversing unit picker 24 can be scrolled left or right to set the length unit of each agitation cycle. The two basic length units supported are rev (revolutions of the development tank) and sec (seconds). Different embodiments may require support for additional units.

E.g. For film processor 9, each agitation cycle refers to the rotation of development tank 10 in one direction. The direction of rotation alternates with every agitation cycle. The rev unit refers to a complete revolution of development tank 10. So, specifying auto-reversing length (scalar) 2.0 and auto-reversing length unit rev indicates that development tank 10 should be rotated 2.0 revolutions per agitation cycle, before the direction of rotation is reversed and a new agitation cycle begins.

Changes to settings in the motor interface are saved by selecting the OK button 26. Changes to settings in the motor interface are reverted by selecting the CANCEL button 27. After selecting either OK button 26 or CANCEL button 27, the motor interface exits.

Figure 9:
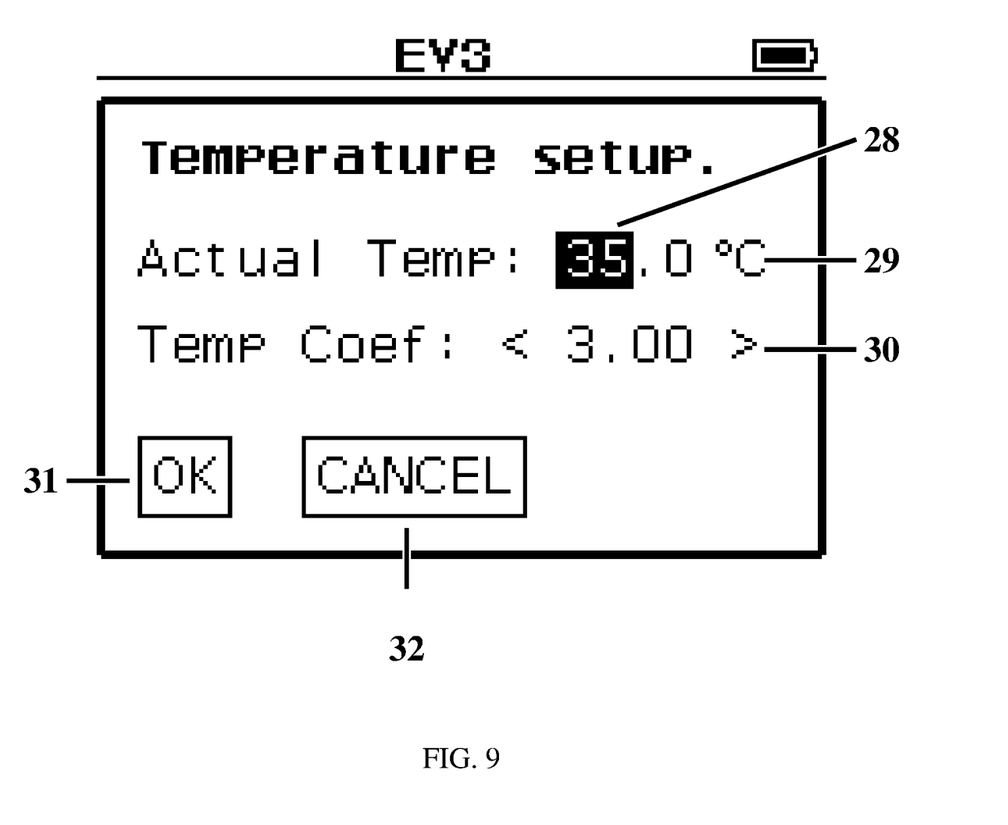
FIG. 9 is an illustration of an electronic display showing the temperature interface for configuring temperature compensation. The user can input the current operating temperature and the temperature coefficient of his/her chemicals. The temperature coefficient determines how the rate of development changes with changes in temperature. Different developers may have different temperature coefficients.

FIG. 9 illustrates an electronic display showing the temperature interface for configuring temperature compensation. The temperature interface comprises the following elements: temperature picker 28, temperature mode picker 29, temperature coefficient picker 30, OK button 31, and CANCEL button 32. Temperature picker 28 can be scrolled left or right to set the chemistry temperature (a decimal value) the user wishes to use for his/her development process. Temperature mode picker 29 can be scrolled left or right to choose between three different modes: Celsius, Fahrenheit, and Sensor. Celsius and Fahrenheit modes allow the user to specify the chemistry temperature in Celsius and Fahrenheit respectively. Sensor mode allows the user to specify that the chemistry temperature should be read in real time using an attached temperature sensor. Temperature coefficient picker 30 can be scrolled left or right to set the temperature coefficient (a decimal in between 1.0 to 4.0) to use for a specific developer. Changes to settings in the temperature interface are saved by selecting OK button 31. Changes to settings in the temperature interface are reverted by selecting CANCEL button 32. After selecting either OK button 31 or CANCEL button 32, the motor interface exits.

Figure 10:
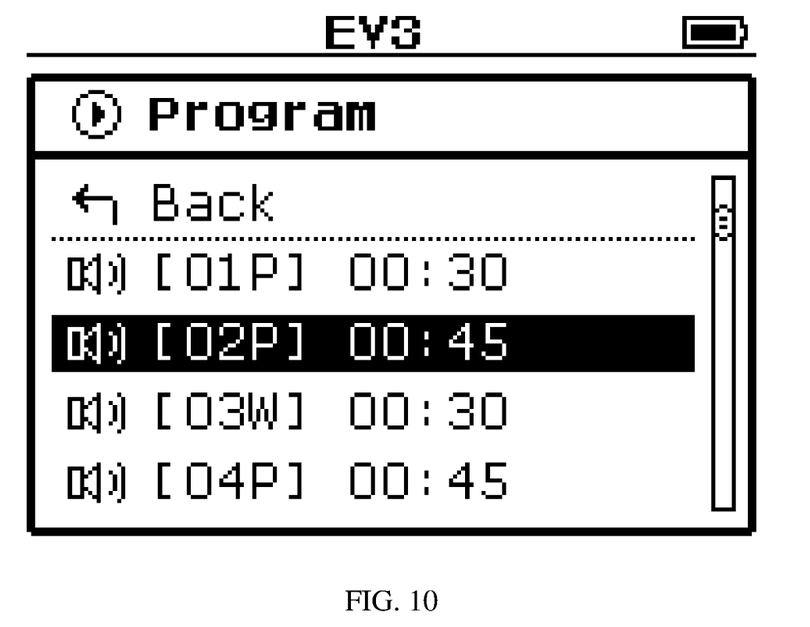
FIG. 10 is an illustration of an electronic display showing the program menu for inputting process times. The user can scroll through a list of up to 20 process steps. Different embodiments may allow the use of more than 20 process steps. These process steps are loaded into the process timer shown in FIG. 5.

FIG. 10 illustrates an electronic display showing the program menu for inputting process times. The program menu comprises a scrollable list of step times numbered from 1 to 20. Different embodiments may allow the use of more than 20 step times. Selecting an entry in the menu opens the step editor popup window from FIG. 11.

Figure 11:
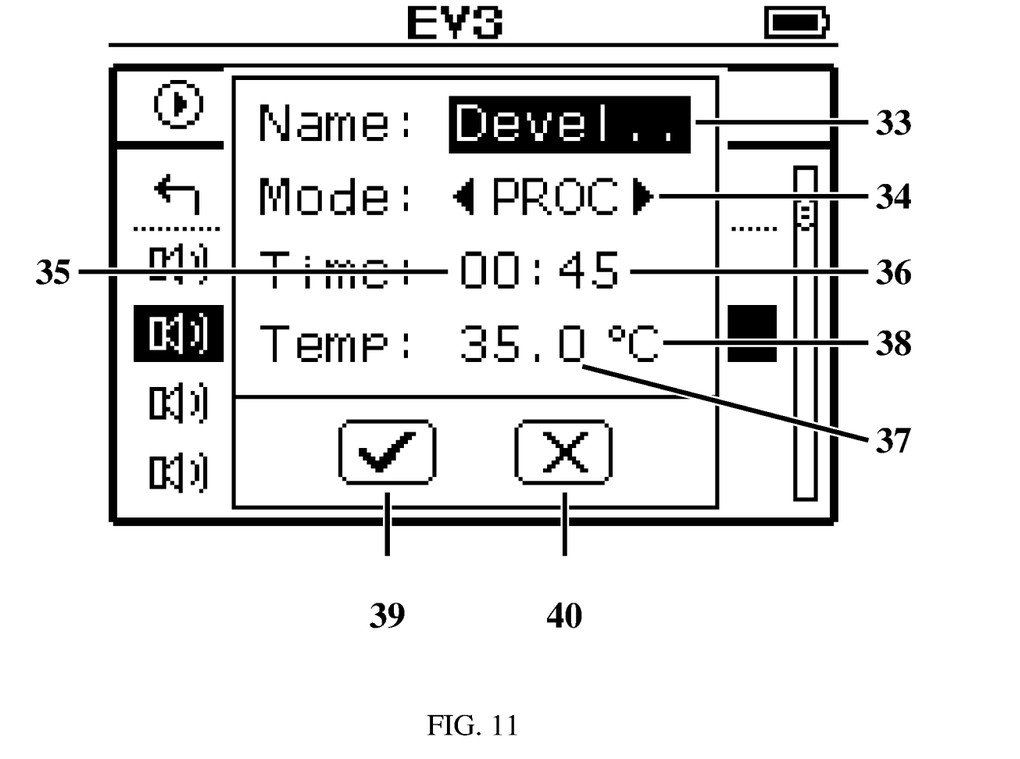
FIG. 11 is an illustration of an electronic display showing the step editor popup window. Upon selecting a step in the program menu from FIG. 10, the step editor popup window opens to allow the user to edit the step name, mode, time, and temperature.

FIG. 11 illustrates an electronic display showing the step editor popup window. The step editor popup window comprises the following elements: step name input 33, step mode picker 34, step time hour picker 35, step time minute picker 36, step temperature picker 37, step temperature mode picker 38, save button 39, and revert button 40. Select step name input 33 to open a keyboard interface for the user to edit the step name. Step mode picker 34 can be scrolled left or right to choose between the four step modes: PROC, WASH, TIME, and METR. Step time hour picker 35 and step time minute picker 36 can be scrolled left or right to set the hour and minutes of the step time respectively. Step temperature picker 37 can be scrolled left or right to set the step temperature (a decimal value). Step temperature mode picker 38 can be scrolled left or right to choose between three different modes: Celsius, Fahrenheit, and OFF. Celsius and Fahrenheit modes enable temperature compensation for the step and allow the user to specify a step temperature in Celsius and Fahrenheit respectively. Temperature compensation is disabled in OFF mode.

The step time inputted by the user is the uncompensated time. Temperature compensation is applied to the inputted time. The actual time used is computed when running the process timer interface illustrated in FIG. 5. Inputting a step temperature tells the software that the specified step time is only valid at the specified step temperature, and temperature compensation will be automatically applied if necessary.

E.g. Suppose you input a step time of 7:30 and step temperature of 20° C. (68° F.). During processing, the timer will count up to 7:30 when the actual temperature of your chemicals is 20° C. (68° F.). If the chemistry temperature is not 20° C. (68° F.), then temperature compensation will be activated. Lets say the chemistry temperature is 22° C. (72° F.); the time will be automatically decreased to 6:15 to compensate for the developer reacting quicker due to the increased temperature.

Figure 12:
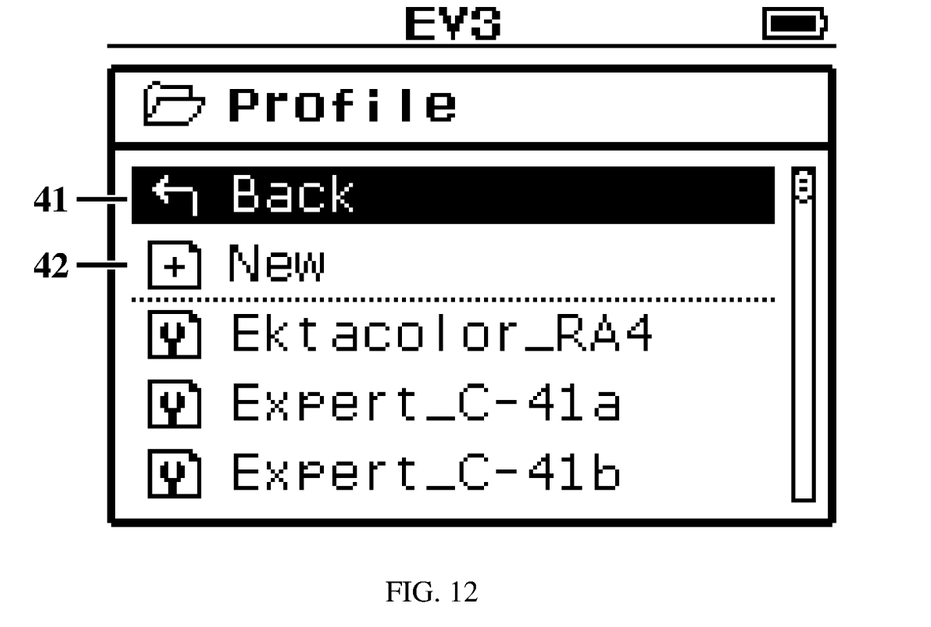
FIG. 12 is an illustration of an electronic display showing the profile menu for saving all settings into profiles in a file system. A scrollable list of existing saved profiles is displayed akin to a file browser on a computer.

FIG. 12 illustrates an electronic display showing the profile menu for saving all settings into profiles in a file system. The profile menu comprises a scrollable list of entries divided into two sections.

The first menu section includes a list of entries which correspond to different operations relating to profiles. At a minimum, there are two entries in the first menu section: Back 41 and New 42. Other entries may be added as necessary for different embodiments. Selecting Back 41 exits the profile menu. Selecting New 42 opens a keyboard interface for the user to specify the name of a new profile. All existing settings are saved into the new profile (stored as a file).

The second menu section comprises a list of entries corresponding to existing profiles (stored as files). Selecting a profile from the profile menu opens the file popup menu from FIG. 13.

Figure 13:
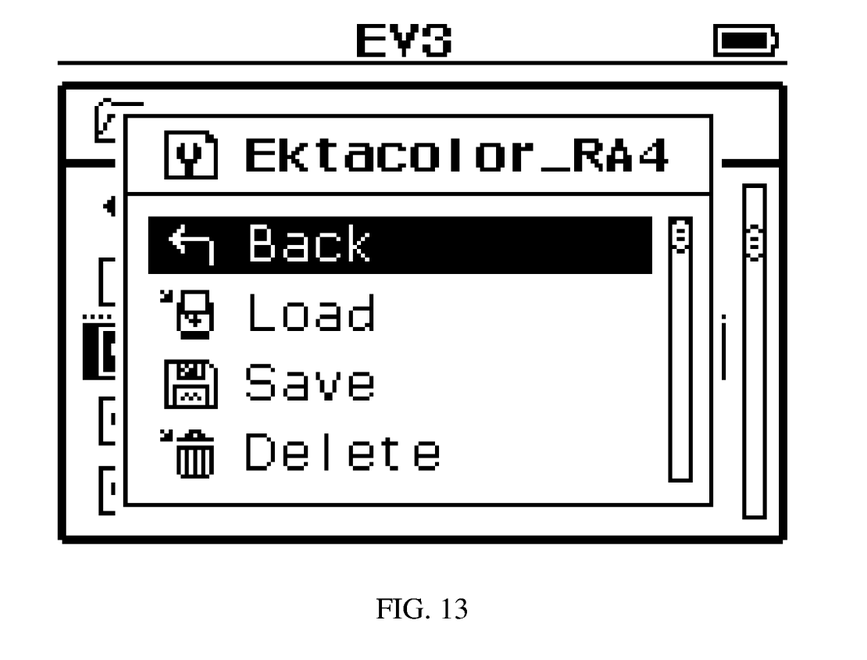
FIG. 13 is an illustration of an electronic display showing the file popup menu. Upon selecting a profile in the profile menu from FIG. 12, the file popup menu is displayed. The file popup menu shows a scrollable list of options for different operations which may be performed on the file: such as loading the file, saving into the file, deleting the file, renaming the file, etc.

FIG. 13 illustrates an electronic display showing the file popup menu. The file popup menu comprises a scrollable list of file operations akin to the right-click popup menu for files in a file browser on a PC. Common file operations like Load (a.k.a Open), Delete, Save (a.k.a Overwrite), and Rename are listed as entries in the file popup menu.

Figure 14:
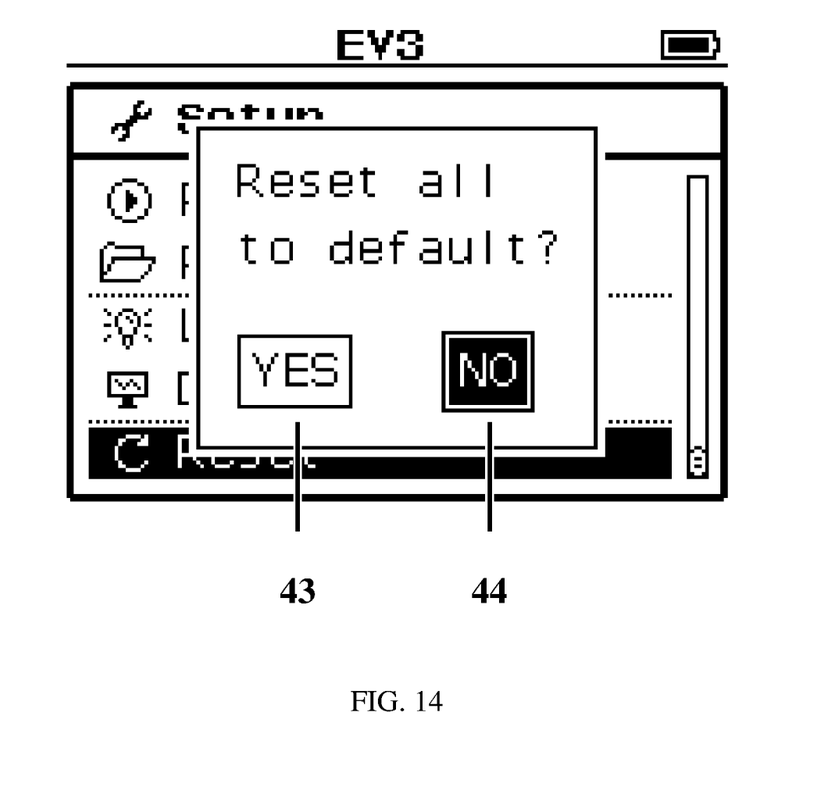
FIG. 14 is an illustration of an electronic display showing the reset confirmation popup window. When the user choose to reset all settings to factory defaults (by selecting Reset in the setup menu from FIG. 6), the reset confirmation popup window opens asking the user to confirm whether or not he truly wants to erase his existing settings and reset to factory defaults.

Referring now to FIG. 14, an electronic display showing the reset confirmation popup window is illustrated. When the user selects the Reset entry in the setup menu from FIG. 6, the reset confirmation popup window opens. The popup window comprises two elements: YES button 43 and NO button 44. If the user selects YES button 43, all settings are erased and reset to default values. Saved profiles are not modified. If the user selects NO button 44, the reset confirmation popup window closes.

Although the present invention has been illustrated and described herein with reference to preferred embodiments and specific examples thereof, it will be readily apparent to those of ordinary skill in the art that various modification or variations may be made in the present invention without departing from the scope or spirit of the invention. Other embodiments of the invention will be apparent to those skilled in the art from consideration of the specification and practice of the invention disclosed herein.

What is claimed is:

1. A method for timing and monitoring the processing of photographic films and prints in chemistry, comprising:
at an electronic device with a display:
displaying, on the display, a timer user interface including a plurality of informational items and timer control elements corresponding to a programmed step, wherein the programmed step is associated with a film or print process, wherein the film or print process includes performing an agitation technique with films or prints submerged in a chemical bath at an operating temperature for a processing time, wherein the programmed step includes a time associated with the processing time, wherein the programmed step includes a mode associated with the agitation technique, and wherein the programmed step includes a temperature compensation mode associated with the operating temperature.

2. The method of claim 1, wherein the plurality of informational items includes the name of the currently selected programmed step.

3. The method of claim 1, wherein the plurality of informational items includes a time elapsed or time remaining corresponding to the currently selected programmed step.

4. The method of claim 1, wherein the plurality of informational items includes a single line of text instructions corresponding to the currently selected programmed step.

5. The method of claim 1, wherein the plurality of timer control elements includes a control element that, when activated, sets the current programmed step to another programmed step previously inputted by the user.

6. The method of claim 1, wherein the plurality of timer control elements includes a control element that, when activated, sets the mode of the currently selected programmed step.

7. The method of claim 1, wherein the plurality of timer control elements includes a start control element that, when activated, starts the timer corresponding to the currently selected programmed step.

8. The method of claim 1, wherein the plurality of timer control elements includes a stop control element that, when activated, stops the timer corresponding to the currently selected programmed step and, when the elapsed time has reached the step time plus temperature compensation, selects the next programmed step.

9. The method of claim 1, wherein the plurality of timer control elements includes a reset control element that, when activated, resets the elapsed time of the currently selected programmed step to 0 seconds.

10. The method of claim 1, further comprising signaling alarms every 30 seconds, when specified by the mode of the currently selected programmed step.

11. The method of claim 1, further comprising automatically agitating films through communication with an external agitation device, when the timer runs, and when specified by the mode of the currently selected programmed step.

12. A system for timing and monitoring the processing of photographic films and prints in chemistry, comprising:
a computing device, comprising:
a processor;
a display; and a memory having computer-executable instructions stored thereon, the instructions being configured to:
display, on the display, a timer user interface including a plurality of informational items and timer control elements corresponding to a programmed step, wherein the programmed step is associated with a film or print process, wherein the film or print process includes performing an agitation technique with films or prints submerged in a chemical bath at an operating temperature for a processing time, wherein the programmed step includes a time associated with the processing time, wherein the programmed step includes a mode associated with the agitation technique, and wherein the programmed step includes a temperature compensation mode associated with the operating temperature.

13. The system of claim 12, wherein the plurality of informational items includes the name of the currently selected programmed step.

14. The system of claim 12, wherein the plurality of informational items includes a time elapsed or time remaining corresponding to the currently selected programmed step.

15. The system of claim 12, wherein the plurality of informational items includes a single line of text instructions corresponding to the currently selected programmed step.

16. The system of claim 12, wherein the plurality of timer control elements includes a control element that, when activated, sets the current programmed step to another programmed step previously inputted by the user.

17. The system of claim 12, wherein the plurality of timer control elements includes a control element that, when activated, sets the mode of the currently selected programmed step.

18. The system of claim 12, wherein the plurality of timer control elements includes a start control element that, when activated, starts the timer corresponding to the currently selected programmed step.

19. The system of claim 12, wherein the plurality of timer control elements includes a stop control element that, when activated, stops the timer corresponding to the currently selected programmed step and, when the elapsed time has reached the step time plus temperature compensation, selects the next programmed step.

20. The system of claim 12, wherein the plurality of timer control elements includes a reset control element that, when activated, resets the elapsed time of the currently selected programmed step to 0 seconds.

21. The system of claim 12, further comprising signaling alarms every 30 seconds, when specified by the mode of the currently selected programmed step.

22. The system of claim 12, further comprising automatically agitating films through communication with an external agitation device, when the timer runs, and when specified by the mode of the currently selected programmed step.

* * * * *